UNITED STATES PATENT OFFICE.

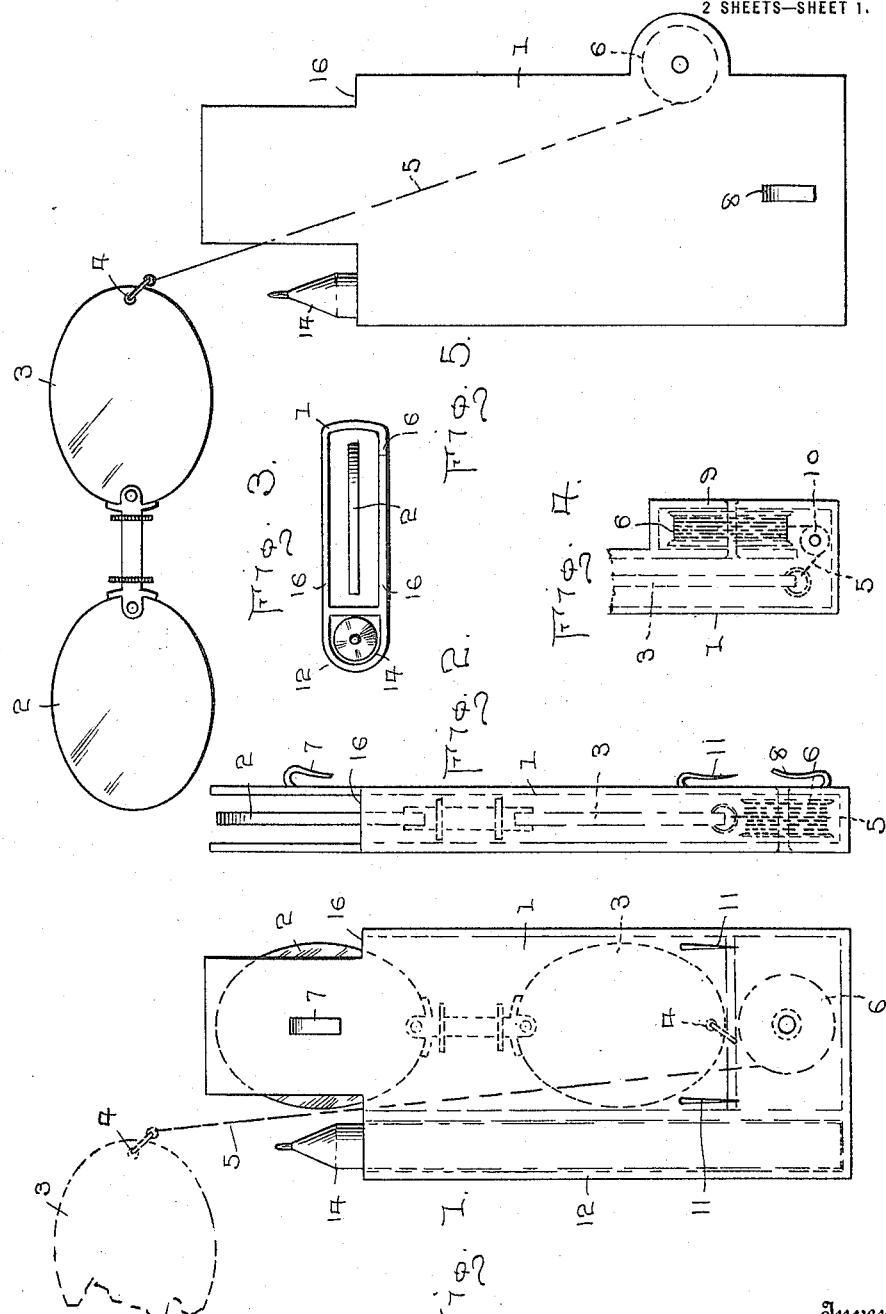

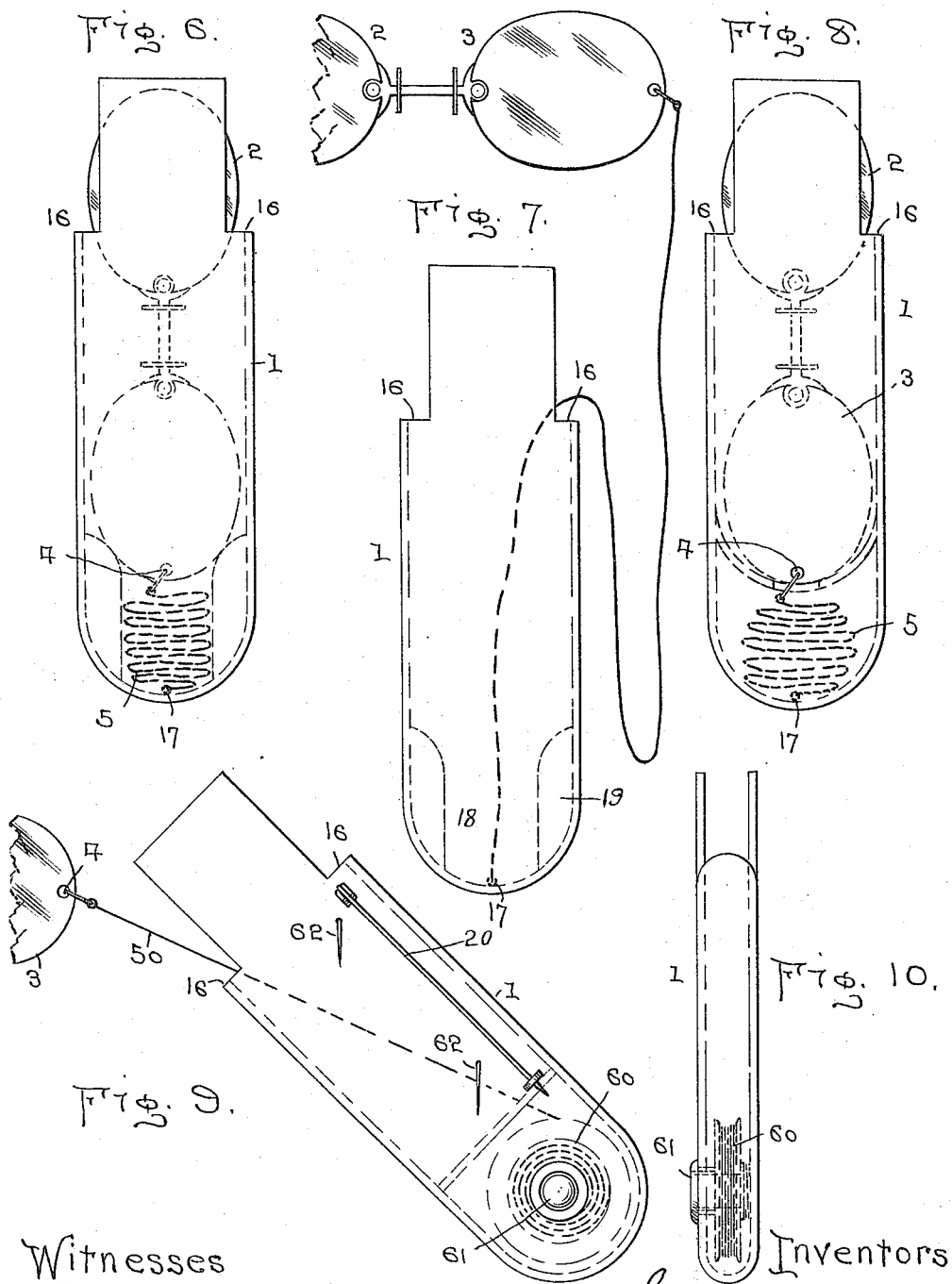

JOHN M. BRADLEY AND CHARLES F. PIKE, OF PHILADELPHIA, PENNSYLVANIA.

EYEGLASS-CASE.

1,158,169.  Specification of Letters Patent.  Patented Oct. 26, 1915.

Application filed September 26, 1913. Serial No. 791,999.

*To all whom it may concern:*

Be it known that we, JOHN M. BRADLEY and CHARLES F. PIKE, citizens of the United States, residing at Philadelphia, in the county of Philadelphia and State of Pennsylvania, have invented certain new and useful Improvements in Eyeglass-Cases, of which the following is a specification.

This invention relates to eye glass cases and has for its general object to improve the construction and operation of such devices and to increase their utility without materially increasing the cost of manufacture.

A special object of the invention is to provide an eye glass case of such construction as to render it extremely easy and convenient to insert the glasses in the case and to remove them therefrom.

A further special object of the invention is to provide an eye glass case with improved means whereby the safety of the glasses is insured.

With these objects in view the invention consists in the improved construction, arrangement and combination of the parts of an eye glass case which will be hereinafter fully described and afterward specifically claimed.

In order that the construction and operation thereof may be readily comprehended, we have illustrated an embodiment of the invention, and a modification thereof, in the accompanying drawings, in which—

Figure 1, represents a view in front elevation of an eye glass case constructed in accordance with our invention with a pair of glasses and a lead pencil contained therein, Fig. 2, a view in side elevation, Fig. 3, a plan view, Fig. 4, a fragmentary view of a slight modification, Fig. 5, a view of the case in outline, showing a pair of glasses outside the case with the suspending cord or chain leading into the same, the winding reel being shown in another modified location from that shown in Figs. 1 and 4, Fig. 6, a view, in front elevation, of a modification in which the reel inside the case is omitted, Fig. 7, a similar view with the glasses out of the case, Fig. 8, a similar view with the inner end of the case slightly modified, Fig. 9, a similar view of a modification in which an interior reel is shown, and Fig. 10, a view in side elevation of the case shown in Fig. 9.

Wherever the same parts occur in a plurality of the figures of the drawings they are indicated by the same reference characters.

Referring specifically to the drawings, 1, in all of the figures, indicates the eye glass case and 2 and 3 the lenses of the eye glasses, the last named being provided with a hole 4 in which is connected a cord or chain 5 leading in Figs. 1 to 5 and 9 and 10 from a spring reel 6 or 60, of any ordinary or well known construction, located and secured in the inside of the case. The reel may be of the push-button type as used in tape reels, or it may be automatic. Inasmuch as such reels are well-known, and can be purchased ready-made, they form no part of our invention and we therefore consider it unnecessary to show or describe the construction in detail, it being only necessary to state that the automatic reel is so constructed that by drawing the cord or chain out, and allowing it to be slowly drawn back by the spring upon the reel, the winding will be stopped by a pawl. When the spring is allowed to operate quickly the pawl is inactive, after the manner of spring roller curtains, and the cord or chain is entirely wound upon the reel, holding the glasses in the case as clearly shown in Figs. 2 and 4.

When the push-button type is used, the cord or chain will be wound up on the reel when the button 61, Figs. 9 and 10 is pushed.

It will thus be readily understood that the glasses may be drawn out of the case, unwinding any desired length of the cord or chain, which latter will take the course shown in dotted outline in Figs. 1, 5, 9, when the eye glass is outside, part of the glasses being shown outside of the case in Fig. 1, in dotted lines, and all of the glasses outside in full lines in Figs. 5 and 9.

In the construction shown in Figs. 5 and 9 the reel is in a different location from that shown in Figs. 1 and 4.

At the open ends the case 1 is cut away on each side at 16 permitting the edges of the lens 2 to project slightly so that they may be readily grasped with the thumb and finger in order to remove the glasses from the case or to re-insert them. The case may also be provided with a hook or catch 7, as shown in Figs. 1 and 2, in order to secure it upon the garment, or in a pocket thereof.

Near its lower end the case is provided with a sharp pointed hook or hooks 11 which may be entered into the garment, or material of the pocket, at the same time that the hook or catch 7 is engaged, in order to prevent swinging or oscillation of the case upon said hook 7 when the wearer is moving from place to place or stooping and rising. These hooks 11 may be used in conjunction with safety pins if desired.

Should it be desirable to wear the case in an inverted position, as is often done when a short case is used, an inverted hook 8, Fig. 5, may be used to suspend the case from the garment with the mouth downward.

Instead of mounting the reel 6 inside of the case as shown in Figs. 1 and 2, it might be secured to the edge of the case as shown in Fig. 5 or it might be located in an extension 9 on the side of the case as shown in Fig. 4, in which instance the case will be provided with a guide roller 10, inside of the case, around which the cord or chain 5 will move in inserting and removing the glasses from the case.

At 12, in Figs. 1 and 3, we have shown a pocket formed on the edge of the case 1 to receive a pen or pencil 14 which will thus be held in a handy position and secured against displacement or loss, without interfering with the operation or use of the eye glass case.

The extension 9 may be dispensed with and the reel mounted as shown in Fig. 9 in the inner end of the case, as at 60.

The cord or chain 5 may be secured, as shown in Figs. 6 to 8, to the inside of the lower end of the case as at 17. With this construction the cord or chain may be returned to the case of its own weight and, as in Fig. 6, stored in a well or space 18 between two stops 19, on which the inner lens 3 of the glass may rest, or the cord or chain may be stored in the inner end of the case, as in Fig. 8.

In Fig. 9 is shown a pin 20 of nearly the length of the case 1 by means of which the case may be supported, without liability of turning or swinging to a perpendicular position by its own weight, in a position inclined to the perpendicular. In this position the cord or chain may be drawn out, substantially in the direction indicated in said Fig. 9 at 50, thus avoiding contact with and friction against the upper edge of the case, as at 16. Such results can be obtained with cases held vertical only by raising the hand very high, immediately above the case.

Vertically placed hooks 62, 62, might be used if desired.

The simplicity, economy of construction, and utility of our invention will be readily apparent and while we have specifically described the construction and arrangement of the various parts, we desire it to be understood that slight changes and variations may be made therein without departing from the spirit and scope of the invention.

Having thus fully described our invention what we claim as new and desire to secure by Letters Patent of the United States is—

1. An eyeglass case adapted to receive the eyeglasses and provided with a cord and with a spring reel located in the case to draw the cord and glasses entirely within the case and hold them yieldingly therein.

2. An eye glass case provided with a spring reel in the bottom thereof for the attachment and winding of an eye glass cord or chain into the case when the eye glass is contained entirely within the case.

3. An eyeglass case provided with a reel located in its inner end, and an inner stop upon which the inner lens rests when inserted and contained within the case.

4. An eyeglass case provided with a reel located therein and a stop to prevent the lens of a glass from contacting with the reel when the glass is drawn within the case.

5. An eye glass case provided with means whereby it may be secured to a garment in a position inclined to the perpendicular, and a reel located in the inner end of the case whereby the cord or chain may be withdrawn in a direction to avoid friction with the case, without the necessity of raising the hand to a position vertically above the case.

6. An eye glass case provided with suspending hooks near its top and bottom whereby it may be secured to a garment in a position inclined to the perpendicular, and a reel located in the inner end of the case whereby the cord or chain may be withdrawn in a direction to avoid friction with the case, without the necessity of raising the hand to a position vertically above the case.

In testimony whereof we, affix our signatures in presence of two witnesses.

JOHN M. BRADLEY.
CHARLES F. PIKE.

Witnesses:
M. J. MacFarlan,
John A. Barry.

Copies of this patent may be obtained for five cents each, by addressing the "Commissioner of Patents, Washington, D. C."